United States Patent
Saito et al.

(10) Patent No.: US 8,605,750 B2
(45) Date of Patent: Dec. 10, 2013

(54) WIRELESS RELAY STATION APPARATUS

(75) Inventors: Yoshiko Saito, Kanagawa (JP);
Katsuhiko Hiramatsu, Kanagawa (JP);
Ayako Horiuchi, Kanagawa (JP);
Kenichi Miyoshi, Kanagawa (JP);
Megumi Ichikawa, legal representative, Kanagawa (JP); Masayuki Hoshino, Kanagawa (JP); Shinsuke Takaoka, Kanagawa (JP); Seigo Nakao, Kanagawa (JP); Yasuaki Yuda, Kanagawa (JP);
Kenichi Kuri, Kanagawa (JP)

(73) Assignee: Panasonic Corporation, Osaka (JP)

(*) Notice: Subject to any disclaimer, the term of this patent is extended or adjusted under 35 U.S.C. 154(b) by 211 days.

(21) Appl. No.: 12/993,061

(22) PCT Filed: May 13, 2009

(86) PCT No.: PCT/JP2009/002093
§ 371 (c)(1),
(2), (4) Date: Feb. 8, 2011

(87) PCT Pub. No.: WO2009/141974
PCT Pub. Date: Nov. 26, 2009

(65) Prior Publication Data
US 2011/0176474 A1     Jul. 21, 2011

(30) Foreign Application Priority Data

May 19, 2008   (JP) ................ P2008-130749
Aug. 28, 2008  (JP) ................ P2008-220138

(51) Int. Cl.
*H04J 3/24*     (2006.01)
*H04Q 11/04*    (2006.01)

(52) U.S. Cl.
CPC ............... *H04Q 11/0478* (2013.01)
USPC ................................ 370/474; 370/315

(58) Field of Classification Search
USPC ................ 370/315, 328–338, 474
See application file for complete search history.

(56) References Cited

U.S. PATENT DOCUMENTS

| | | |
|---|---|---|
| 2005/0190821 A1 | 9/2005 | Fujii |
| 2007/0081603 A1 | 4/2007 | Jang |
| 2007/0184826 A1* | 8/2007 | Park et al. ............... 455/422.1 |
| 2009/0073914 A1* | 3/2009 | Sun et al. ................... 370/315 |

FOREIGN PATENT DOCUMENTS

| | | |
|---|---|---|
| JP | 2003-174392 | 6/2003 |
| JP | 2005-229524 | 8/2005 |
| JP | 2008-109664 | 5/2008 |

OTHER PUBLICATIONS

International Search Report dated Aug. 18, 2009.
Y. Hao, et al., "Achievable Rates for Network Coding on the Exchange Channel," IEEE Military Communications Conference, Oct. 2007, pp. 1-7.

* cited by examiner

*Primary Examiner* — Kan Yuen
(74) *Attorney, Agent, or Firm* — Dickinson Wright PLLC

(57) ABSTRACT

A wireless relay station apparatus for enabling a mobile station and a base station to reliably receive network coding data and to provide sufficient reception performance is provided. (1) A repeater divides data X received from a mobile station into important data and non-important data and divides data Y received from eNB into important data and non-important data. Next, (2) the repeater places the data so that important data Sx for the mobile station and important data Sy for the eNB do not overlap, XORs (exclusive ORs) them, and generates network coding data X (X) Y. (3) The repeater applies downlink propagation inverse characteristic H1$^{-1}$ to important data portion Px (X) Sy for the mobile station and on the other hand, applies uplink propagation inverse characteristic H0$^{-1}$ to important data portion Sx (X) Py for the eNB in the network coding data X (X) Y for transmission.

10 Claims, 13 Drawing Sheets

FIG. 2
SEQUENCE CHART OF EMBODIMENT 1
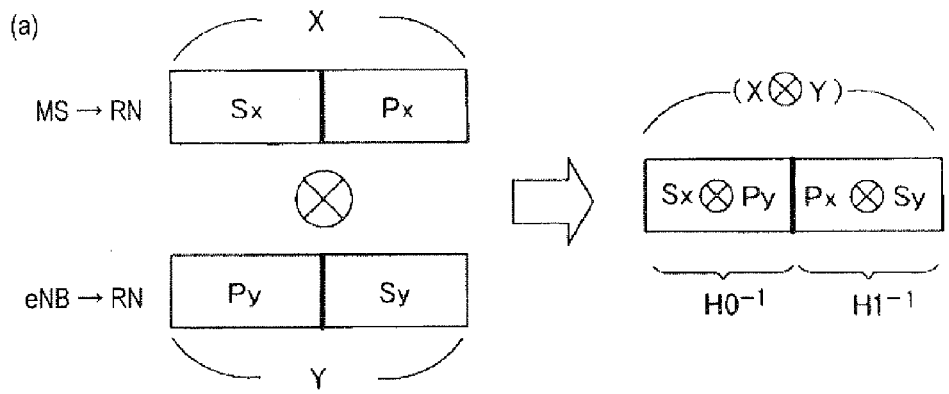
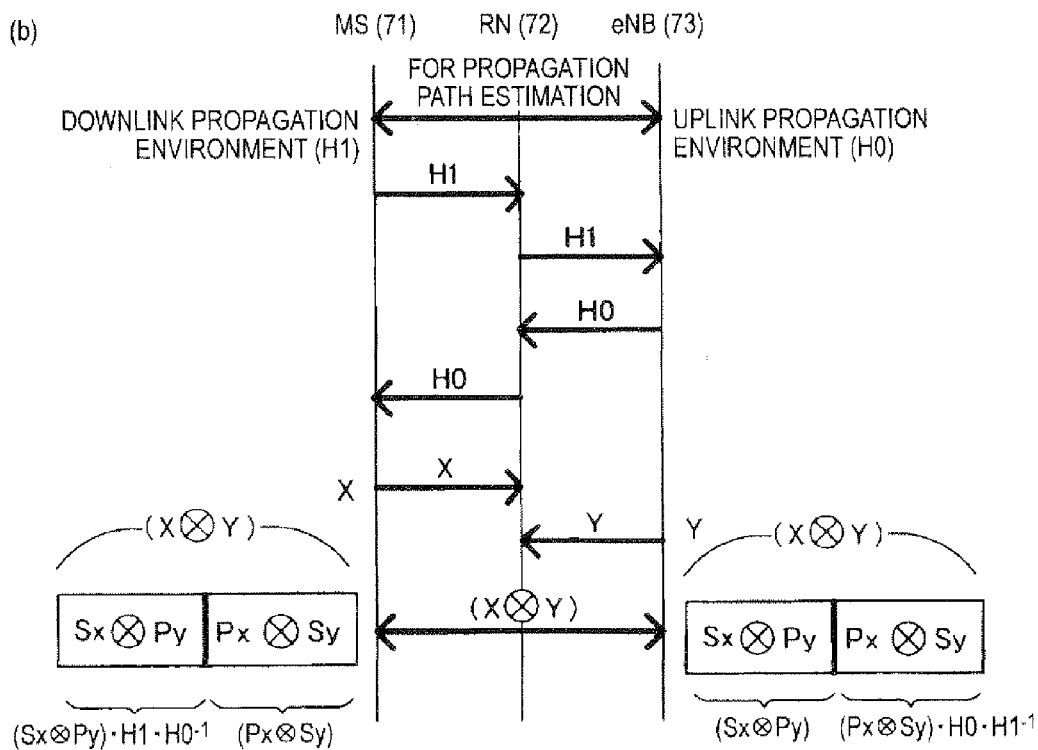

FIG. 3
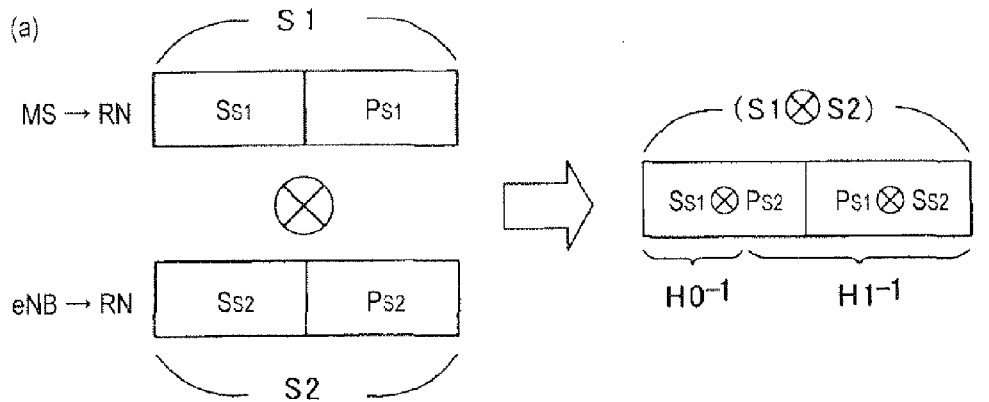
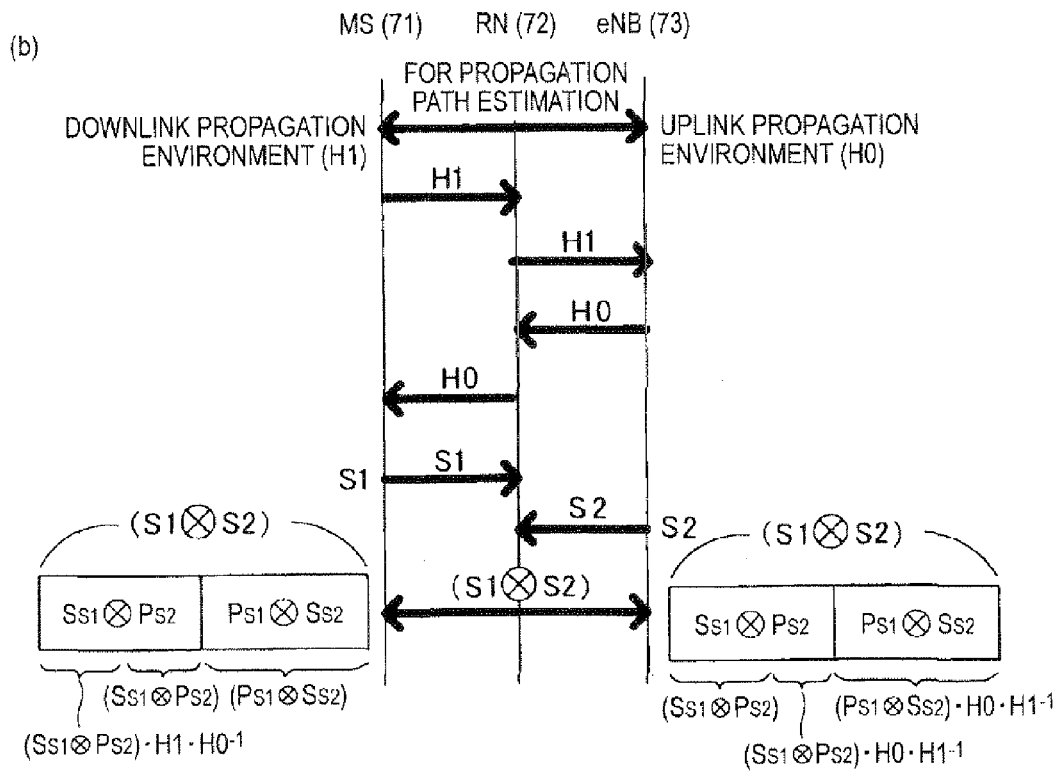

FIG. 5  MOBILE STATION BLOCK DIAGRAM OF EMBODIMENT 1

FIG. 6 eNB BLOCK DIAGRAM OF EMBODIMENT 1

OPERATION EXAMPLE OF NETWORK CODING IN REPEATER

PROBLEM IMAGE IN CONVENTIONAL EXAMPLE

US 8,605,750 B2

WIRELESS RELAY STATION APPARATUS

TECHNICAL FIELD

This invention relates to a wireless relay station apparatus and in particular to a wireless relay station apparatus for making it possible for a mobile station and a base station to reliably receive network coding data and to obtain sufficient reception performance in the mobile station and the base station.

BACKGROUND ART

Hitherto, network coding has been used as a mechanism for efficiently transmitting information on a wired network; at present, applying the mechanism (the network coding) to a wireless repeater (which will be hereinafter simply called repeater) is actively discussed.

FIG. 10 shows a wireless repeating system by a mobile station (MS) 71, a repeater 72, and an eNB (base station) 73. An operation example of network coding in the repeater 72 will be discussed with reference to FIG. 10.

Step 1: The mobile station (MS) 71 transmits data X to the communicating repeater 72.

Step 2: The eNB 73 transmits data Y to the communicating repeater 72.

Step 3: Repeater 72 XORs (exclusive ORs) the data X and Y and transmits data (X XOR Y) to the mobile station 71 and the eNB73 (hereinafter, data subjected to the processing will be called network coding data).

Step 4: The mobile station 71 grasps the data X transmitted by the station and thus can extract the data Y from the received data (X XOR Y).

Step 5: The eNB 73 grasps the data Y transmitted by the station and thus can extract the data X from the received data (X XOR Y).

In so doing, conventionally processing of transmitting the data X from the repeater 72 to the eNB 73 and transmitting the data Y from the repeater 72 to the mobile station 71 can be performed at a time, so that use efficiency of the frequency and the time can be enhanced.

RELATED ART DOCUMENTS

Patent Documents

Patent Document 1: JP-A-2003-174392
Patent Document 2: JP-A-2005-229524

SUMMARY OF THE INVENTION

Problems to be Solved by the Invention

However, to use the mechanism of the network coding for wireless communications, problems that cannot occur in wired communications exist. As one of the problems, largely different propagation characteristic exists between the repeater 72 and the mobile station 71 and between the repeater 72 and eNB 73 and network coding data to which independent propagation characteristic is applied is received in the mobile station 71 and the eNB 73.

Then, it is considered that precoding processing of previously compensating for the propagation characteristic and sending data is performed. To perform precoding for the network coding data, there is a problem in that which propagation characteristic the precoding is performed conforming to is not known. The precoding is an art of applying inverse characteristic of propagation characteristic and previously compensating for in the sending party, thereby sending data to the receiving party.

That is, as shown in FIG. 11, if the downlink propagation characteristic to the mobile station 71 viewed from the repeater is H1 and the uplink propagation characteristic to the eNB73 is H0, there is an incompatible demand of wanting to applying $H1^{-1}$ to the network coding data for the mobile station 71 and wanting to applying $H0^{-1}$ to the network coding data for eNB 73.

Then, as a simple solution method, a method of applying inverse characteristic $H1^{-1}$ of downlink propagation environment to the network coding data so as to be advantageous for the mobile station 71 by the repeater 72 is considered because the repeater 72 is a fixed device and is often in a sight environment with the eNB 73 and generally it is considered that the propagation environment between the repeater 72 and the eNB 73 is good and on the other hand, it is assumed that the propagation environment between the repeater 72 and the mobile station 71 is poor as compared with the propagation environment between the repeater 72 and the eNB 73.

FIG. 12 is an operation sequence chart among the mobile station (MS) 71, the repeater (RN) 72, and the eNB 73. Transmission and reception of data between the mobile station (MS) and the eNB 73 through the repeater will be discussed by taking FIG. 12 as an example.

Step 1: The mobile station 71 reports downlink propagation characteristic H1 to the repeater 72. The repeater 72 reports H1 to the eNB 73.

Steps 2: The eNB 73 reports uplink propagation characteristic H0 to the repeater 72. The repeater 72 reports H0 to the mobile station 71.

Step 3: The mobile station 71 transmits data X to the repeater 72.

Step 4: The eNB 73 transmits data Y to the repeater 72.

Step 5: The repeater 72 XORs (exclusive ORs) the data X and Y and further applies downlink propagation inverse characteristic $H1^{-1}$ to the whole data (X XOR Y) and transmits the data to the mobile station 71 and the eNB 73.

Step 6: The mobile station 71 can extract the data Y from the received (X XOR Y) data because the downlink propagation characteristic is previously compensated for.

Step 7: The inverse characteristics of H0 and $H1^{-1}$ predicted to be applied to the network coding data are generated from H1 reported at step 1 and H0 that the home station originally has and compensates for the propagation characteristic for the received network coding data and then can extract the data X from the received (X XOR Y) data.

In so doing, if the propagation characteristic H0(H1-1 applied to the whole network coding data received in the eNB 73 does not involve a problem, correct data can be received in the mobile station 71 and the eNB73.

However, as shown in FIG. 13, the reception characteristic of the eNB73 largely varies depending on the propagation characteristic H0(H1-1 applied to the whole network coding data received in the eNB 73. For example, in the worst case where the diagonal element of H0·H1-1 becomes "0," there is a problem in that the network coding data cannot be received in the eNB 73.

It is an object of the invention to provide a wireless relay station apparatus for enabling a mobile station and a base station to reliably receive network coding data and to provide sufficient reception performance.

Means for Solving the Problems

A wireless relay station apparatus of the invention is a wireless relay station apparatus for relays between a first wireless communication apparatus and a second wireless communication apparatus, the wireless relay station apparatus includes: a reception section that receives data from the first wireless communication apparatus and the second wireless communication apparatus; a network coding data generation section that generates network coding data using first data received from the first wireless communication apparatus and second data received from the second wireless communication apparatus, wherein the network coding data is generated by dividing each of the data into a highly important block and a low important block and processing exclusive OR operation between the highly important block of each of the data and the low important block of each of the data; a precoding section that applies different precoding to one part and the other part of the network coding data; and a transmission section that transmits the precoded network coding data.

According to the configuration described above, in each of the first wireless communication apparatus and the second wireless communication apparatus, the data block of high importance and the data block of low importance can be ideally received, so that while the data can be reliably received, the reception performance of the whole system improves as compared with a conventional system.

In the configuration described above, the highly important block of each of the data contains a systematic part having a systematic bit and the low important block of each of the data contains a parity part having a parity bit.

According to such a configuration, in each of the first wireless communication apparatus and the second wireless communication apparatus, the systematic part having the important systematic bits can be ideally received, so that while the data can be reliably received, the reception performance of the whole system improves as compared with a conventional system.

The wireless relay station apparatus of the invention includes an estimation section that estimates propagation quality communicating with the first wireless communication apparatus relating to low important block and propagation quality communicating with the second wireless communication apparatus relating to the low important block, based on a propagation characteristic communicating with the first wireless communication apparatus and an inverse characteristic of the propagation characteristic communicating with the first wireless communication apparatus, and based on a propagation characteristic communicating with the second wireless communication apparatus and an inverse characteristic of the propagation characteristic communicating with the second wireless communication apparatus; and a resource allocation section that allocates transmission resources to the network coding data for transmitting the network coding data. According to such a configuration, in each of the first wireless communication apparatus and the second wireless communication apparatus, the systematic part having the important systematic bits can be ideally received, so that while the data can be reliably received, the reception performance of the whole system improves as compared with a conventional system. Further, scheduling considering the propagation quality of the parity part is performed, so that the reception performance of the parity part having the parity bits also improves in the first wireless communication apparatus and the second wireless communication apparatus.

In the wireless relay station apparatus of the invention, the one part of the network coding data contains the systematic part of the first data and the other part of the network coding data contains the systematic part of the second data; and the precoding section applies the inverse characteristic of the propagation characteristic communicating with the second communication apparatus to the one part of the network coding data, and applies the inverse characteristic of the propagation characteristic communicating with the first communication apparatus to the other part of the network coding data.

According to the configuration described above, the inverse characteristic of the propagation characteristic with the second communication apparatus is applied to the one part of the network coding data and the inverse characteristic of the propagation characteristic with the first communication apparatus is applied to the other part of the network coding data. Thus, the systematic part having the important systematic bits can be taken out without compensating for the propagation characteristic in the first wireless communication apparatus and the second wireless communication apparatus.

Advantages of the Invention

As described above, according to the wireless relay station apparatus of the invention, compensation for the downlink propagation characteristic is previously made for the important data transmitted to the mobile station, so that data can be taken out without compensating for the propagation characteristic in the mobile station. Compensation for the uplink propagation characteristic is previously made for the important data transmitted to the eNB, so that data can be taken out without compensating for the propagation characteristic in the eNB. Thus, in the mobile station and the eNB, the network coding data can be reliably received and in addition, further sufficient reception performance can be obtained.

BRIEF DESCRIPTION OF THE DRAWINGS

FIG. 2 is a sequence chart to describe Embodiment 1 in a wireless relay station apparatus of the invention.

FIG. 3 is a sequence chart to describe a variation of Embodiment 1 in the wireless relay station apparatus of the invention.

MODE FOR CARRYING OUT THE INVENTION

In the invention, as an example of a wireless relay station apparatus for repeating communications between a first communication apparatus and a second communication apparatus, (1) attention is focused on importance of data received from the first communication apparatus and the second communication apparatus, whereby the data is divided into blocks where importance of the data is high and blocks where importance of the data is low, (2) the blocks are placed so that the blocks where importance of the data is high do not overlap and network coding data is generated from the blocks where importance of the data is high and the blocks where importance of the data is low, and (3) the network coding data is divided into one part and the other part, different precoding is applied to them, and the precoded network coding data is transmitted. The division positions in (3) may the same as or may different from the division positions in (1). Embodiments described below are examples of the description of the invention and the invention is not limited to them.

As the selection criteria of the importance, (1) transmission data is self decodable or is non self decodable; as an example, the transmission data is separated into a systematic part and a parity part, (2) transmission data is separated into transmission data containing redundant data and transmission data containing no redundant data, (3) transmission data is separated according to a flag indicating whether or not the transmission data is control data or information, and the like are considered. To change coding in response to the importance in the same data, as the selection criteria of the importance, whether the coding rate of the transmission data is high or low is considered. Further, if emergency information (for example, information relating to handover) and usual information mix in the same data, as the selection criteria of the importance, (5) whether the data is emergency information or usual information is considered. The nature of the importance may differ between an uplink propagation path and a downlink propagation path.

Figure 1:
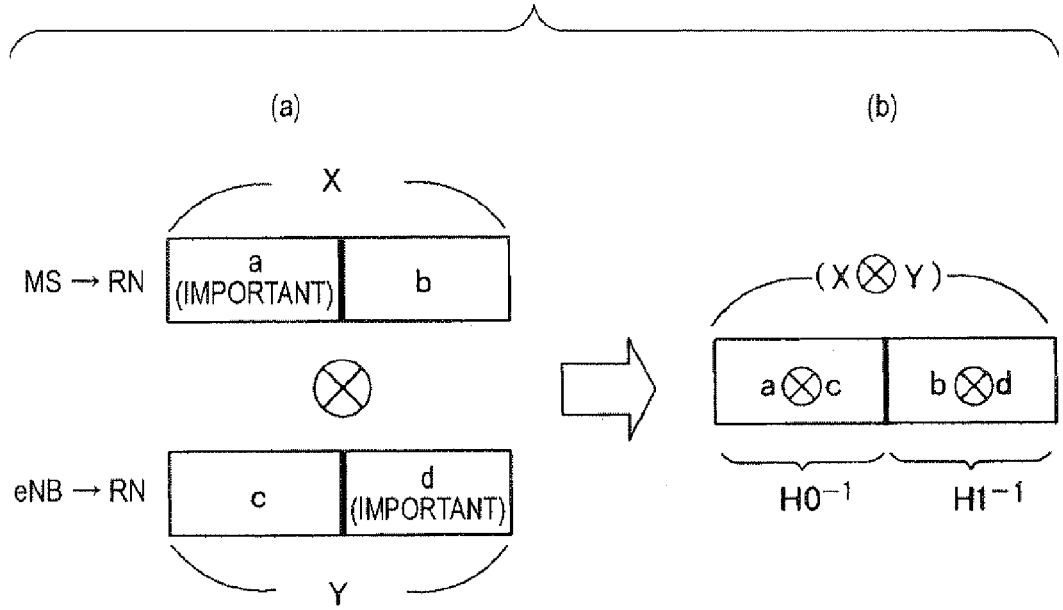
FIG. 1 is a drawing to describe network coding in a wireless relay station apparatus of the invention.

FIG. 1 is an image drawing of the invention. As shown in FIG. 1 (a), a repeater RN divides data X received from a mobile station MB (MS->RN) into a (important) and b by focusing attention on the importance of the data and divides data Y received from a base station eNB (hereinafter, abbreviated as eNB) (eNB->RN) into c and d (important) by focusing attention on the importance of the data. Next, (2) the repeater RN places the data so that the important data d (importance) for the mobile station MS and the important data a (importance) for the eNB do not overlap, and XORs (exclusive ORs) them. Hereinafter, the data thus formed will be described as (1) data portion b (X) d containing the important data d for the mobile station MS and (2) data portion a (X) c containing the important data for the eNB.

As shown in FIG. 1 (b), the repeater RN applies a downlink propagation inverse characteristic $H1^{-1}$ to the important data portion b (X) d for the mobile station MS and on the other hand, applies an uplink propagation inverse characteristic $H0^{-1}$ to the important data portion a (X) c for the eNB.

According to the invention, compensation for the propagation characteristic is previously made for the important data b (X) d transmitted to the mobile station MS, so that data can be taken out without compensating for the propagation characteristic in the mobile station. Compensation for the propagation characteristic is previously made for the important data a (X) c transmitted to the eNB, so that data can be taken out without compensating for the propagation characteristic in the eNB. Thus, in the mobile station MS and the eNB, the network coding data can be reliably received and in addition, further sufficient reception performance can be obtained.

(Embodiment 1)

FIG. 2 (a) is a conceptual drawing of Embodiment 1 in a wireless relay station apparatus of the invention. (1) A repeater RN divides data X received from a mobile station MS (MS->RN) into important data (Sx: For example, systematic part) and non-important data (Px: For example, parity part) and divides data Y received from eNB (eNB->RN) into important data (Sy: For example, systematic part) and non-important data (Py: For example, parity part).

Next, (2) the repeater RN places the data so that the important data Sx for the mobile station MS and the important data Sy for the eNB do not overlap, XORs (exclusive ORs) them, and generates network coding data X (X) Y.

(3) The repeater RN applies downlink propagation inverse characteristic $H1^{-1}$ to the important data portion Px (X) Sy for the mobile station MS and on the other hand, applies uplink propagation inverse characteristic $H0^{-1}$ to the important data portion Sx (X) Py for the eNB in the network coding data X (X) Y for transmission.

Accordingly, the mobile station MS can extract the important data portion Px (X) Sy data without compensating for the downlink propagation characteristic and the eNB can extract the important data portion Sx (X) Py without compensating for the uplink propagation characteristic, so that in the mobile station MS and the eNB, the network coding data can be reliably received and in addition, further sufficient reception performance can be obtained.

FIG. 2 (b) is a sequence chart of Embodiment 1 in the wireless relay station apparatus of the invention. The operation of the wireless relay station apparatus of Embodiment 1 will be discussed with reference to FIG. 2 (b).

Step 1: A mobile station 71 reports the downlink propagation characteristic H1 to a repeater 72. The repeater 72 reports H1 to an eNB 73.

Step 2: The eNB 73 reports the uplink propagation characteristic H0 to the repeater 72. The repeater 72 reports H0 to the mobile station 71.

Step 3: The mobile station 71 transmits data X to the repeater 72.

Step 4: The eNB 73 transmits data Y to the repeater 72.

Step 5: The repeater 72 divides the data X into a systematic part Sx having important systematic bits and a party part Px having parity bits.

Step 6: The repeater 72 divides the data Y into a systematic part Sy having important systematic bits and a party part Py having parity bits.

Step 7: The repeater 72 XORs (exclusive ORs) the data Sx and Py and applies the uplink propagation inverse characteristic to result.

Step 8: The repeater 72 XORs (exclusive ORs) the data Px and Sy and applies the downlink propagation inverse characteristic $H1^{-1}$ to the result.

Step 9: The repeater 72 transmits the data obtained at steps 7 and 8 to the mobile station 71 and the eNB 73 as the network coding data.

Step 10: Since compensation for the downlink propagation characteristic is previously made for the important systematic part Sy, the mobile station 71 can extract the data Sy from the received (Px XOR Sy) data. On the other hand, for the parity part Py, the inverse characteristic of the propagation characteristic $H1 \cdot H0^{-1}$ predicted to be applied is generated from H0 reported at step 2 and H1 that the mobile station originally has and compensation for the propagation characteristic is made for the received network coding data (Sx XOR Py) and then the Py can be taken out.

Step 11: Since compensation for the uplink propagation characteristic is previously made for the important systematic part Sx, the eNB 73 can extract the data Sx from the received (Sx XOR Py) data. On the other hand, for the parity part Px, the inverse characteristic of the propagation characteristic H0·H1$^{-1}$ predicted to be applied is generated from H1 reported at step 1 and H0 that the eNB originally has and compensation for the propagation characteristic is made for the received network coding data (Px XOR Sy) and then the data Px can be taken out.

Thus, according to Embodiment 1, in each of the mobile station 71 and the eNB 73, the systematic part having the important systematic bits can be ideally received, so that while the data can be reliably received, the reception performance of the whole system improves as compared with the conventional system.

FIG. 3 is a drawing to describe an example of adaptively changing the precoding (H0$^{-1}$, H1$^{-1}$) ratio so that Signal-to-Interference-plus-Noise-power-Ratio (which will be hereinafter abbreviated as SINR) in the mobile station (MS) 71 and the eNB 73 becomes the maximum as a variation of Embodiment 1.

That is, as shown in FIG. 3 (a), the repeater applies the uplink propagation inverse characteristic H0$^{-1}$ to a part of systematic part Ss1 (X) Ps2 containing important data for the eNB and applies the downlink propagation inverse characteristic H1$^{-1}$ to all of systematic part Ps1 (X) Ss2 containing important data for the mobile station and a part of parity part Ss1 (X) Ps2 in network coding data S1 (X) S2.

Accordingly, as shown in FIG. 3 (b), the mobile station (MS) 71 can extract all of the important systematic part Ps1 (X) Ss2 and a part of the parity part Ss1 (X) Ps2 from the received data without compensating for the propagation characteristic, and the SINR in the mobile station (MS) 71 can be made the maximum.

As for report of the propagation characteristic, (1) only when the propagation characteristic is reported, the signal received by the repeater is amplified and is transmitted as non playback repeating, (2) the uplink and downlink propagation characteristics are subjected to network coding (H1 XOR H0) and batch report is executed, etc., whereby the report time may be shortened.

Figure 4:
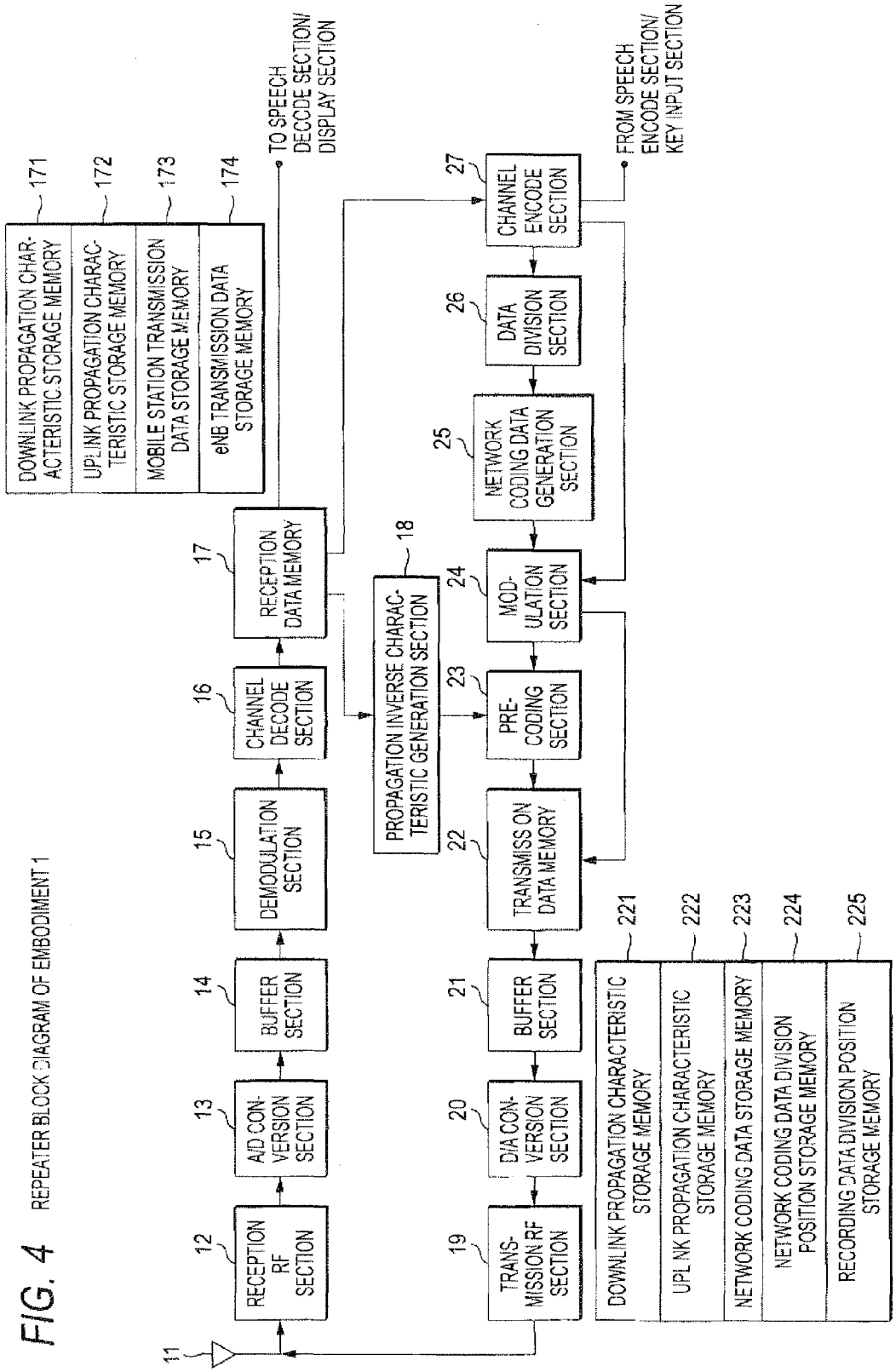
FIG. 4 is a block diagram of a repeater of Embodiment 1 in the wireless relay station apparatus of the invention.

Next, block diagrams of the repeater 72, the mobile station 71, and the eNB 73 according to Embodiment 1 will be discussed. FIG. 4 is the block diagram of the repeater 72 of Embodiment 1.

<<Propagation Characteristic Reception Operation from Mobile Station 71 and eNB 73>>

The repeater 72 receives [downlink propagation characteristic H1 from mobile station 71] in a reception RF section 12. The received signal is down converted up to a baseband in the reception RF section 12 and the signal is input to an A/D conversion section 13. The signal input to the A/D conversion section 13 is converted into a digital signal and the digital signal is stored in a buffer 14 and the demodulation and channel decode processing result of the signal is stored in "downlink propagation characteristic storage memory 171" of reception data memory 17.

Likewise, the repeater 72 receives [uplink propagation characteristic H0 from eNB 73] in the reception RF section 12. The received signal is down converted up to the baseband in the reception RF section 12 and the signal is input to the A/D conversion section 13. The signal input to the A/D conversion section 13 is converted into a digital signal and the digital signal is stored in the buffer 14 and the demodulation and channel decode processing result of the signal is stored in "uplink propagation characteristic storage memory 172" of the reception data memory 17.

<<Propagation Characteristic Transmission Operation to Mobile Station 71 and eNB 73>>

The repeater 72 reads the downlink propagation characteristic H1 from the "downlink propagation characteristic storage memory 171" of the reception data memory 17 and executes channel encode in a channel encode section 27. The data subjected to the channel encode is modulated in a modulation section 24 and is stored in "downlink propagation characteristic storage memory 221" of transmission data memory 22.

Subsequently, the downlink propagation characteristic H1 is read from the "downlink propagation characteristic storage memory 221" of the transmission data memory 22 and is stored in a buffer 21 and then is converted into analog data in a D/A conversion section 20 and the analog data is up converted up to a signal in an RF band and is transmitted from a transmission antenna 11.

Likewise, the repeater 72 reads the uplink propagation characteristic H0 from the "uplink propagation characteristic storage memory 172" of the reception data memory 17 and executes channel encode in the channel encode section 27. The data subjected to the channel encode is modulated in the modulation section 24 and is stored in "uplink propagation characteristic storage memory 222" of the transmission data memory 22.

Subsequently, the uplink propagation characteristic H0 is read from the "uplink propagation characteristic storage memory 222" of the transmission data memory 22 and is stored in the buffer 21 and then is converted into an analog signal in the D/A conversion section 20 and the analog signal is up converted up to a signal in the RF band and is transmitted from the transmission antenna 11.

<<Data Reception Operation from Mobile Station 71 and eNB 73>>

The repeater receives [transmission data X from mobile station 71] in the reception RF section 12. The received signal is down converted up to the baseband in the reception RF section 12 and the signal is input to the A/D conversion section 13. The signal input to the A/D conversion section 13 is converted into a digital signal and the digital signal is stored in the buffer 14 and the demodulation and channel decode processing result of the signal is stored in "mobile station transmission data storage memory 173" of the reception data memory 17.

Likewise, the repeater 72 receives [transmission data Y from eNB 73] in the reception RF section 12. The received signal is down converted up to the baseband in the reception RF section 12 and the signal is input to the A/D conversion section 13. The signal input to the A/D conversion section 13 is converted into a digital signal and the digital signal is stored in the buffer 14 and the demodulation and channel decode processing result of the signal is stored in "eNB transmission data storage memory 174" of the reception data memory 17.

<<Network Coding Data Generation Operation>>

The repeater 72 reads the data X transmitted by the mobile station 71 from the "mobile station transmission data storage memory 173" of the reception data memory 17 and inputs the data to the channel encode section 27. The channel encode section 27 executes channel encode of the data X and a data division section 26 divides the channel encode data into "systematic part Sx" having systematic bits and "parity part Px" having parity bits.

Likewise, the repeater 72 reads the data Y transmitted by the eNB 73 from the "eNB transmission data storage memory 174" of the reception data memory 17 and inputs the data to the channel encode section 27. The channel encode section 27 executes channel encode of the data Y and the data division section 26 divides the channel encode data into "systematic part Sy" having systematic bits and "parity part Py" having parity bits.

A network coding data generation section 25 XORs (exclusive ORs) the "systematic part Sx" and the "parity part Py" and likewise XORs (exclusive ORs) the "systematic part Sy" and the "parity part Px" to generate network coding data so that the "systematic part Sx" and the "systematic part Sy" of the important parts of the divided data do not overlap.

The division position of the network coding data is stored in "network coding data division position storage memory 224" of the transmission data memory 22.

<<Modulation Operation>>

The repeater 72 modulates the network coding data in the modulation section 24.

<<Propagation Inverse Characteristic Generation Operation>>

Subsequently, the repeater 72 reads the downlink propagation characteristic H1 from the "downlink propagation characteristic storage memory 171" of the reception data memory 17 and generates the inverse characteristic reception $H1^{-1}$ of H1 in a propagation inverse characteristic generation section 18. Likewise, the repeater 72 reads the uplink propagation characteristic H0 from the "uplink propagation characteristic storage memory 172" of the reception data memory 17 and generates the inverse characteristic reception $H0^{-1}$ of H0 in the propagation inverse characteristic generation section 18.

<<Precoding Operation>>

The repeater 72 applies the downlink propagation inverse characteristic $H1^{-1}$ generated in the propagation inverse characteristic generation section 18 to the network coding data (Sy XOR Px) containing the "systematic part Sy" important for the mobile station 71 in a precoding section 23 so as to compensate for the downlink propagation characteristic H1 applied at the reception time to the mobile station 71.

Likewise, the repeater 72 applies the uplink propagation inverse characteristic $H0^{-1}$ generated in the propagation inverse characteristic generation section 18 to the network coding data (Sx XOR Py) containing the "systematic part Sx" important for the eNB 73 in the precoding section 23 so as to compensate for the uplink propagation characteristic H0 applied at the reception time to the eNB 73.

The finally generated network coding data in the precoding section 23 is stored in "network coding data storage memory 223" of the transmission data memory 22. The division position of precoding is stored in "precoding division position storage memory 225" of the transmission data memory 22.

<<Network Coding Data Transmission Data>>

The network coding data of the repeater 72 is read from the "network coding data storage memory 223" of the transmission data memory 22 and is stored in the buffer 21 and then is converted into analog data in the D/A conversion section 20 and the analog data is up converted up to a signal in the RF band in a transmission RF section 19 and is transmitted from the transmission antenna 11.

Likewise, the division position of the network coding data is read from the "network coding data division position storage memory 224" of the transmission data memory 22, the division position of the precoding is read from the "precoding division position storage memory 225" of the transmission data memory 22 and the data is stored in the buffer 21 and then is converted into analog data in the D/A conversion section 20 and the analog data is up converted up to a signal in the RF band in the transmission RF section 19 and is transmitted from the transmission antenna 11.

The division positions may be contained in a header of the network coding data or may be transmitted as control data at the division position change timing.

Figure 5:
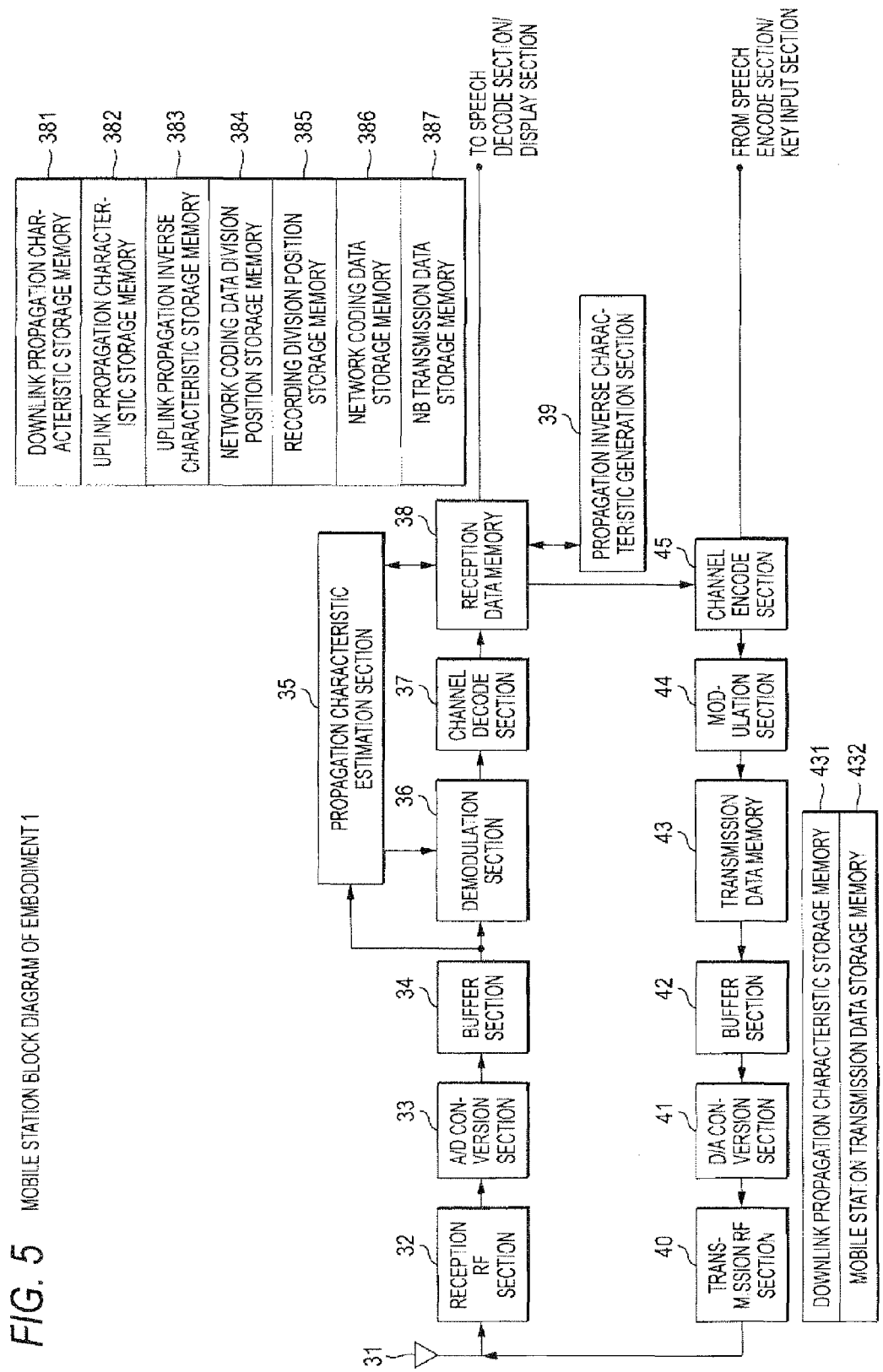
FIG. 5 is a block diagram of a mobile station of Embodiment 1 in the wireless relay station apparatus of the invention.

Next, a block diagram of the mobile station 71 will be discussed. FIG. 5 is a block diagram of the mobile station 71.

<<Downlink Propagation Characteristic Estimation Operation>>

The mobile station 71 receives a reference signal repeated from the repeater 72 in a reception RF section 32. The received signal is down converted up to the baseband in the reception RF section 32 and the signal is input to an A/D conversion section 33. The signal input to the A/D conversion section 33 is converted into a digital signal and the digital signal is stored in a buffer section 34. Then, downlink propagation characteristic H1 is estimated in a propagation characteristic estimation section 35 and is stored in "downlink propagation characteristic storage memory 381" of reception data memory 38 and at the same, is subjected to channel encode in a channel encode section 45, and is subjected to modulation processing in a modulation section 44 and then is also stored in "downlink propagation characteristic storage memory 431" of transmission data memory 43.

<<Uplink Propagation Characteristic Reception Operation>>

Subsequently, the mobile station 71 receives uplink propagation characteristic (H0) data repeated from the repeater 72 in the reception RF section 32. The received signal is down converted up to the baseband in the reception RF section 32 and the signal is input to the A/D conversion section 33. The signal input to the A/D conversion section 33 is converted into a digital signal and the digital signal is stored in the buffer section 34. Then, the demodulation and channel decode processing result of the signal is stored in "uplink propagation characteristic storage memory 382" of the reception data memory 38 and at the same, inverse characteristic $H0^{-1}$ is generated in a propagation path inverse characteristic section 39 and is stored in "uplink propagation inverse characteristic storage memory 383" of the reception data memory 38.

<<Mobile Station Transmission Data Transmission Operation>>

Next, the mobile station 71 reads mobile station transmission data X stored in "mobile station transmission data storage memory 432" of the transmission data memory 43 and stores the data in a buffer 42 and then converts the data into analog data in a D/A conversion section 41, up converts the analog data up to a signal in the RF band in a transmission RF section 40, and transmits the signal from a transmission antenna 31.

<<Network Coding Data Control Information Reception Operation>>

Subsequently, the mobile station 71 receives network coding data repeated from the repeater 72 in the reception RF section 32. The received signal is down converted up to the baseband in the reception RF section 32 and the signal is input to the A/D conversion section 33. The signal input to the A/D conversion section 33 is converted into a digital signal and the digital signal is stored in the buffer section 34. Then, first a header portion is subjected to demodulation and channel decode processing and network coding data division position information and precoding division position information contained in the header portion are stored in "network coding data division position storage memory 384" and "precoding division position storage memory 385" of the reception data memory 38 respectively.

<<Network Coding Data Reception Operation>>

Subsequently, the network coding data division position information and the precoding division position information are read from the "network coding data division position storage memory 384" and the "precoding division position storage memory 385" of the reception data memory 38 respectively. Based on the information, demodulation and channel decode processing are performed for the network coding data portion containing the systematic part Sy important for the mobile station 71. For the network coding data portion containing the parity part Py, the downlink propagation characteristic H1 and the uplink propagation inverse characteristic $H0^{-1}$ are read from the "downlink propagation characteristic storage memory 381" and the "uplink propagation inverse characteristic storage memory 383" of the reception data memory 38 and inverse characteristics of H1 and $H0^{-1}$ are generated in the propagation characteristic estimation section 35. Using the inverse characteristics, while compensating for the propagation characteristic, demodulation and channel decode processing are performed and the data together with (Sy+Py) is stored in "eNB transmission data storage memory 387" of the reception data memory 38.

Figure 6:
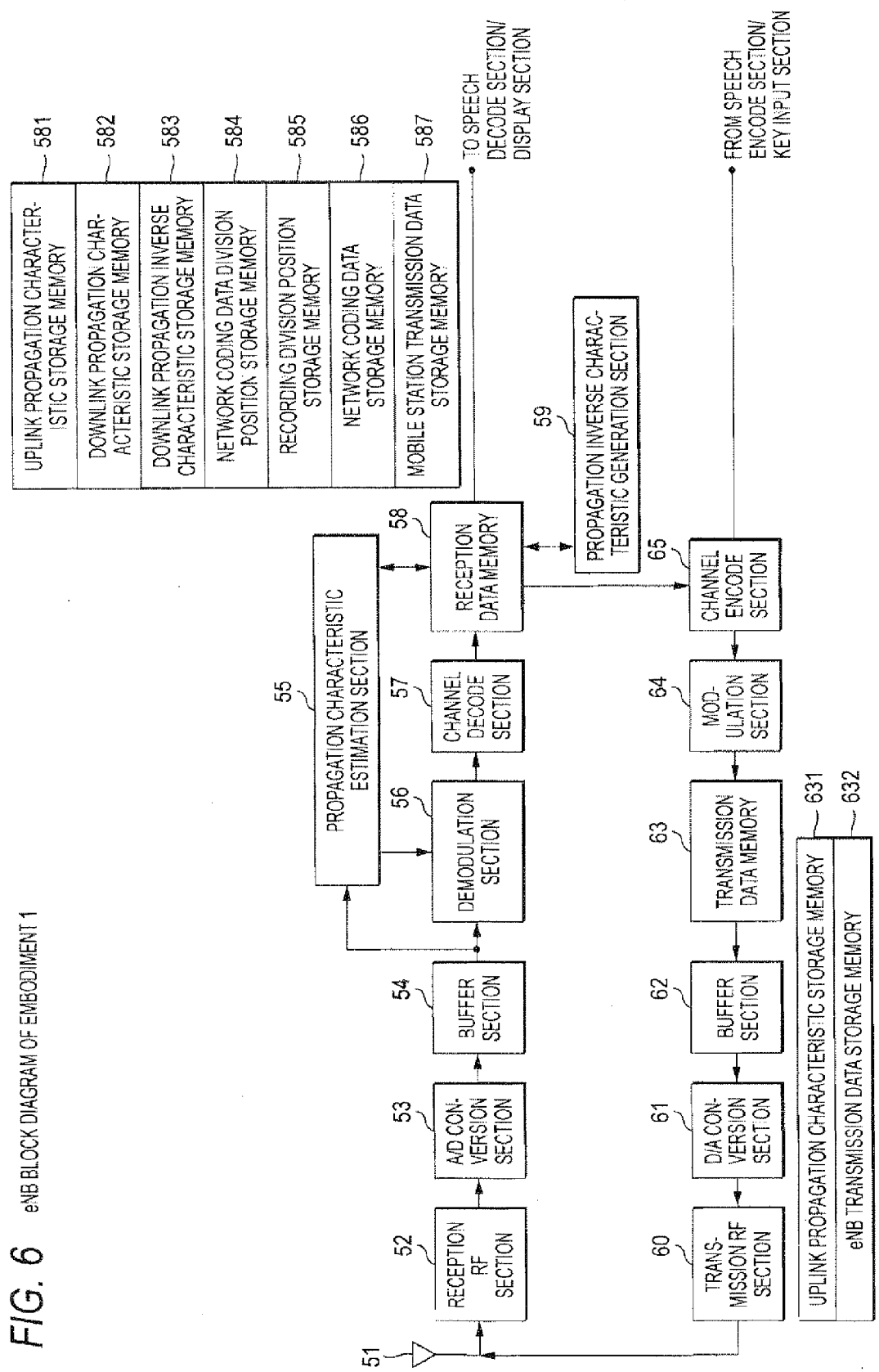
FIG. 6 is a block diagram of an eNB of Embodiment 1 in the wireless relay station apparatus of the invention.

Next, a block diagram of the eNB 73 will be discussed. The block diagram of the eNB 73 differs from the block diagram of the mobile station only in storage contents in memory. FIG. 6 is the block diagram of the eNB 73.

<<Uplink Propagation Characteristic Estimation Operation>>

The eNB 73 receives a reference signal repeated from the repeater 72 in a reception RF section 52. The received signal is down converted up to the baseband in the reception RF section 52 and the signal is input to an A/D conversion section 53. The signal input to the A/D conversion section 53 is converted into a digital signal and the digital signal is stored in a buffer section 54. Then, uplink propagation characteristic H0 is estimated in a propagation characteristic estimation section 55 and is stored in "uplink propagation characteristic storage memory 581" of reception data memory 58 and at the same, is subjected to channel encode in a channel encode section 65, and is subjected to modulation processing in a modulation section 64 and then is also stored in "uplink propagation characteristic storage memory 631" of transmission data memory 63.

<<Downlink Propagation Characteristic Reception Operation>>

Subsequently, the eNB 73 receives downlink propagation characteristic (H1) data repeated from the repeater 72 in the reception RF section 52. The received signal is down converted up to the baseband in the reception RF section 52 and the signal is input to the A/D conversion section 53. The signal input to the A/D conversion section 53 is converted into a digital signal and the digital signal is stored in the buffer section 54. Then, the demodulation and channel decode processing result of the signal is stored in "downlink propagation characteristic storage memory 582" of the reception data memory 58 and at the same, inverse characteristic $H1^{-1}$ is generated in a propagation path inverse characteristic section 59 and is stored in "downlink propagation inverse characteristic storage memory 583" of the reception data memory 58.

<<eNB Transmission Data Transmission Operation>>

Next, the eNB 73 reads eNB transmission data Y stored in "eNB transmission data storage memory 632" of the transmission data memory 63 and stores the data in a buffer 62 and then converts the data into analog data in a D/A conversion section 61, up converts the analog data up to a signal in the RF band in a transmission RF section 60, and transmits the signal from a transmission antenna 51.

<<Network Coding Data Control Information Reception Operation>>

Subsequently, the eNB 73 receives network coding data repeated from the repeater 72 in the reception RF section 52. The received signal is downlink converted up to the baseband in the reception RF section 52 and the signal is input to the A/D conversion section 53. The signal input to the A/D conversion section 53 is converted into a digital signal and the digital signal is stored in the buffer section 54. Then, first a header portion is subjected to demodulation and channel decode processing and network coding data division position information and precoding division position information contained in the header portion are stored in "network coding data division position storage memory 584" and "precoding division position storage memory 585" of the reception data memory 58 respectively.

<<Network Coding Data Reception Operation>>

Subsequently, the network coding data division position information and the precoding division position information are read from the "network coding data division position storage memory 584" and the "precoding division position storage memory 585" of the reception data memory 58 respectively. Based on the information, demodulation and channel decode processing are performed for the network coding data portion containing the systematic part Sx important for the eNB 73. For the network coding data portion containing the parity part Px, the uplink propagation characteristic H0 and the downlink propagation inverse characteristic $H1^{-1}$ are read from the "uplink propagation characteristic storage memory 581" and the "downlink propagation inverse characteristic storage memory 582" of the reception data memory 38 and inverse characteristics of H1 and $H0^{-1}$ are generated in the propagation characteristic estimation section 35. Using the inverse characteristics, while compensating for the propagation characteristic, demodulation and channel decode processing are performed and the data together with (Sx+Px) is stored in "mobile station transmission data storage memory 587" of the reception data memory 58.

Here, the division position is described as for the case where the division position is contained in the header of the network coding data, but the embodiment is not limited to it. The division position information may be received as control data at the timing at which the division position is changed.

Thus, according to Embodiment 1, in each of the mobile station 71 and the eNB 73, the systematic part having the important systematic bits can be ideally received, so that while the data can be reliably received, the reception performance of the whole system improves as compared with the conventional system.

Embodiment 2)

Figure 7:
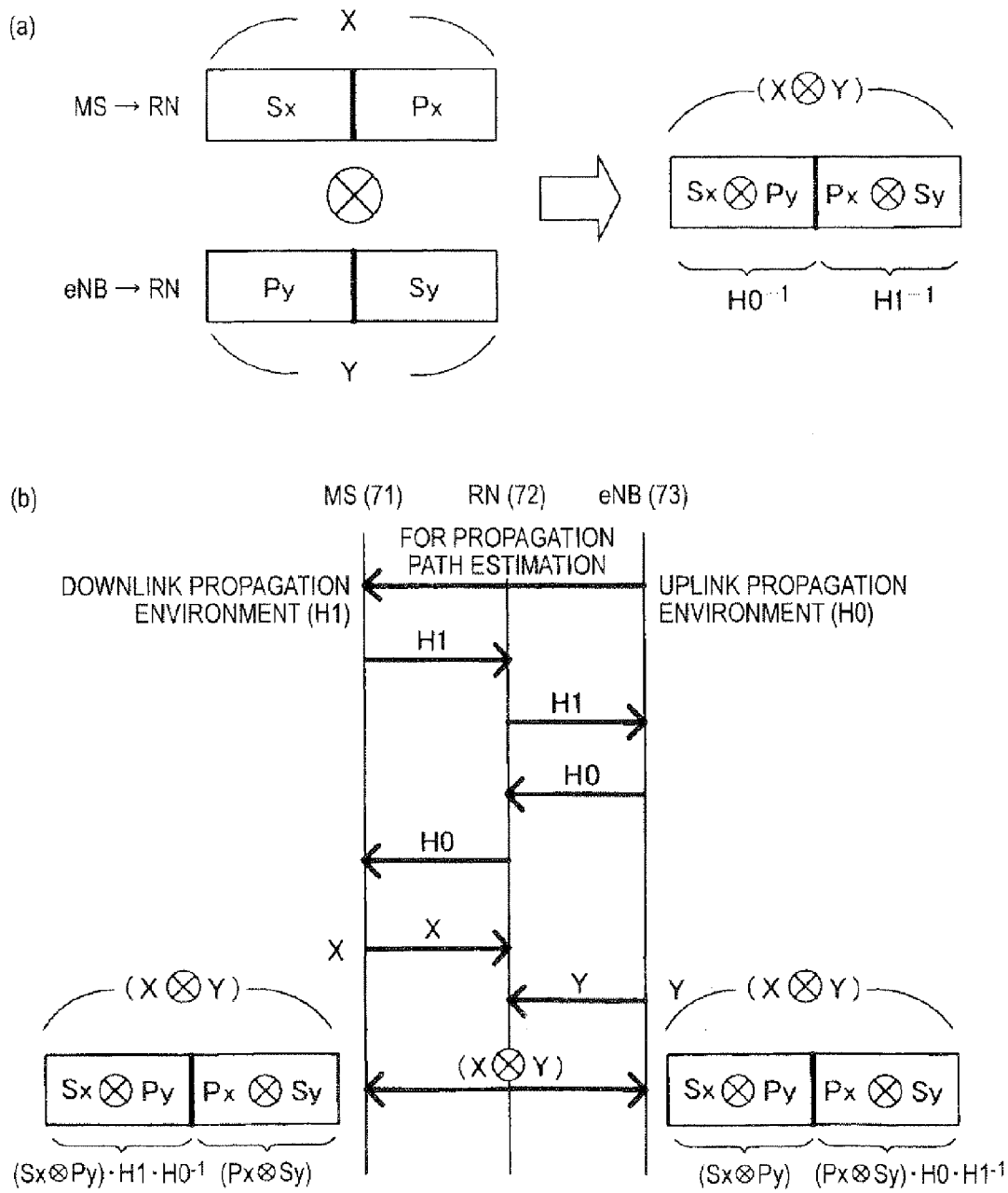
FIG. 7 (a) is a conceptual drawing of Embodiment 2 in a wireless relay station apparatus of the invention and (b) is a sequence chart of Embodiment 2 in the wireless relay station apparatus of the invention.

FIG. 7 (a) is a conceptual drawing of Embodiment 2 in a wireless relay station apparatus (which will be hereinafter simply called repeater) of the invention. (1) A repeater RN divides data X received from a mobile station MS (MS->RN) into important data (Sx: For example, systematic part) and non-important data (Px: For example, parity part) and divides data Y received from eNB into important data (Sy: For example, systematic part) and non-important data (Py: For example, parity part).

Next, (2) the repeater RN places the data so that the important data Sx for the mobile station MS and the important data Sy for the eNB do not overlap, XORs (exclusive ORs) the divided data, and generates network coding data X (X) Y.

(3) The repeater RN schedules so that transmission resources are allocated to network coding data X (X) Y with better propagation quality of the parity part based on the propagation quality (channel quality) estimated from uplink propagation characteristic and its inverse characteristic and downlink propagation characteristic and its inverse characteristic. In other words, the repeater RN grasps uplink propagation characteristic H0 and downlink propagation characteristic H1 and thus can find (the propagation characteristic of the parity part received in the eNB) of composite characteristic $H0 \cdot H1^{-1}$ of the uplink propagation characteristic H0 and downlink propagation inverse characteristic $H1^{-1}$ and (propagation characteristic of the parity part received in the MS) of composite characteristic $H1 \cdot H0^{-1}$ of the downlink propagation characteristic H1 and uplink propagation inverse characteristic $H^{-1}$ and schedules so that transmission resources are allocated to network coding data X (X) Y with better propagation quality of the parity part based on the propagation quality (channel quality) estimated from the result.

(4) The repeater RN applies the downlink propagation inverse characteristic $H1^{-1}$ to the important data portion Px (X) Sy for the mobile station MS and on the other hand, applies the uplink propagation inverse characteristic $H0^{-1}$ to the important data portion Sx (X) Py for the eNB in the network coding data X (X) Y for transmission.

Accordingly, the mobile station MS can extract the important data portion Px (X) Sy data without compensating for the downlink propagation characteristic. The eNB can extract the important data portion Sx (X) Py without compensating for the uplink propagation characteristic. Therefore, in the mobile station MS and the eNB, the network coding data can be reliably received and in addition, further sufficient reception performance can be obtained. Further, the repeater RN schedules considering the propagation quality of the parity part, so that the reception performance of the parity part also improves in the mobile station MS and the eNB.

FIG. 7 (b) is a sequence chart of Embodiment 2 in the wireless relay station apparatus (which will be hereinafter called repeater) of the invention. The operation of Embodiment 2 will be discussed with reference to FIG. 7 (b). The operation of the repeater of Embodiment 2 differs from the operation of the repeater of Embodiment 2 in that the propagation quality (channel quality) of the parity part of the network coding data is estimated and mapping is performed so as to allocate the transmission resources to data with the better propagation quality of the parity part and then the network coding data is transmitted to the mobile station and the eNB.

The components of the repeater, the mobile station, and the eNB of Embodiment 2 identical with the components of Embodiment 1 are denoted by the same reference numerals and will be discussed.

Step 1: A mobile station 71 reports the downlink propagation characteristic H1 to a repeater 72. The repeater 72 reports H1 to an eNB 73.

Step 2: The eNB 73 reports the uplink propagation characteristic H0 to the repeater 72. The repeater 72 reports H0 to the mobile station 71.

Step 3: The mobile station 71 transmits data X to the repeater 72.

Step 4: The eNB 73 transmits data Y to the repeater 72.

Step 5: The repeater 72 divides the data X into a systematic part Sx having important systematic bits and a party part Px having parity bits.

Step 6: The repeater 72 divides the data Y into a systematic part Sy having important systematic bits and a party part Py having parity bits.

Step 7: The repeater 72 XORs (exclusive ORs) the data Sx and Py and applies the uplink propagation inverse characteristic $H0^{-1}$ to the result.

Step 8: The repeater 72 XORs (exclusive ORs) the data Px and Sy and applies the downlink propagation inverse characteristic $H1^{-1}$ to the result by.

Step 9: The repeater 72 calculates propagation characteristic $H1 \cdot H0^{-1}$ of the parity part received by the mobile station 71 and propagation characteristic $H0 \cdot H1^{-1}$ of the parity part received by the eNB and estimates the propagation quality (channel quality) of each of the parity parts received by the mobile station 71 and the eNB 73 from the calculation result.

Step 10: The repeater 72 schedules so as to allocate the transmission resources to the data with the better propagation quality based on the estimation result of the propagation quality of each parity part obtained at step 9.

Step 11: The repeater 72 transmits the data obtained at steps 7 and 8 to the mobile station 71 and the eNB 73 as the network coding data.

Step 12: Since compensation for the propagation characteristic is previously made for the important systematic part Sy, the mobile station 71 can extract the data Sy from the received (Px XOR Sy) data. On the other hand, for the parity part Py, the inverse characteristic of the propagation characteristic $H1 \cdot H0^{-1}$ predicted to be applied is generated from H0 reported at step 2 and H1 that the mobile station originally has and compensation for the propagation characteristic is made for the received network coding data (Sx XOR Py) and then the Py can be taken out.

Step 13: Since compensation for the uplink propagation characteristic is previously made for the important systematic part Sx, the eNB 73 can extract the data Sx from the received (Sx XOR Py) data. On the other hand, for the parity part Px, the inverse characteristic of the propagation characteristic $H0 \cdot H1^{-1}$ predicted to be applied is generated from H1 reported at step 1 and H0 that the eNB originally has and compensation for the propagation characteristic is made for the received network coding data (Px XOR Sy) and then the data Px can be taken out.

Thus, according to Embodiment 2, in each of the mobile station 71 and the eNB 73, the systematic part having the important systematic bits can be ideally received, so that the data can be reliably received and the reception performance of the whole system improves. Further, the repeater RN schedules considering the propagation quality of the parity parts, so that the reception performance of the parity parts having parity bits also improves in the mobile station MS and the eNB.

Figure 9:
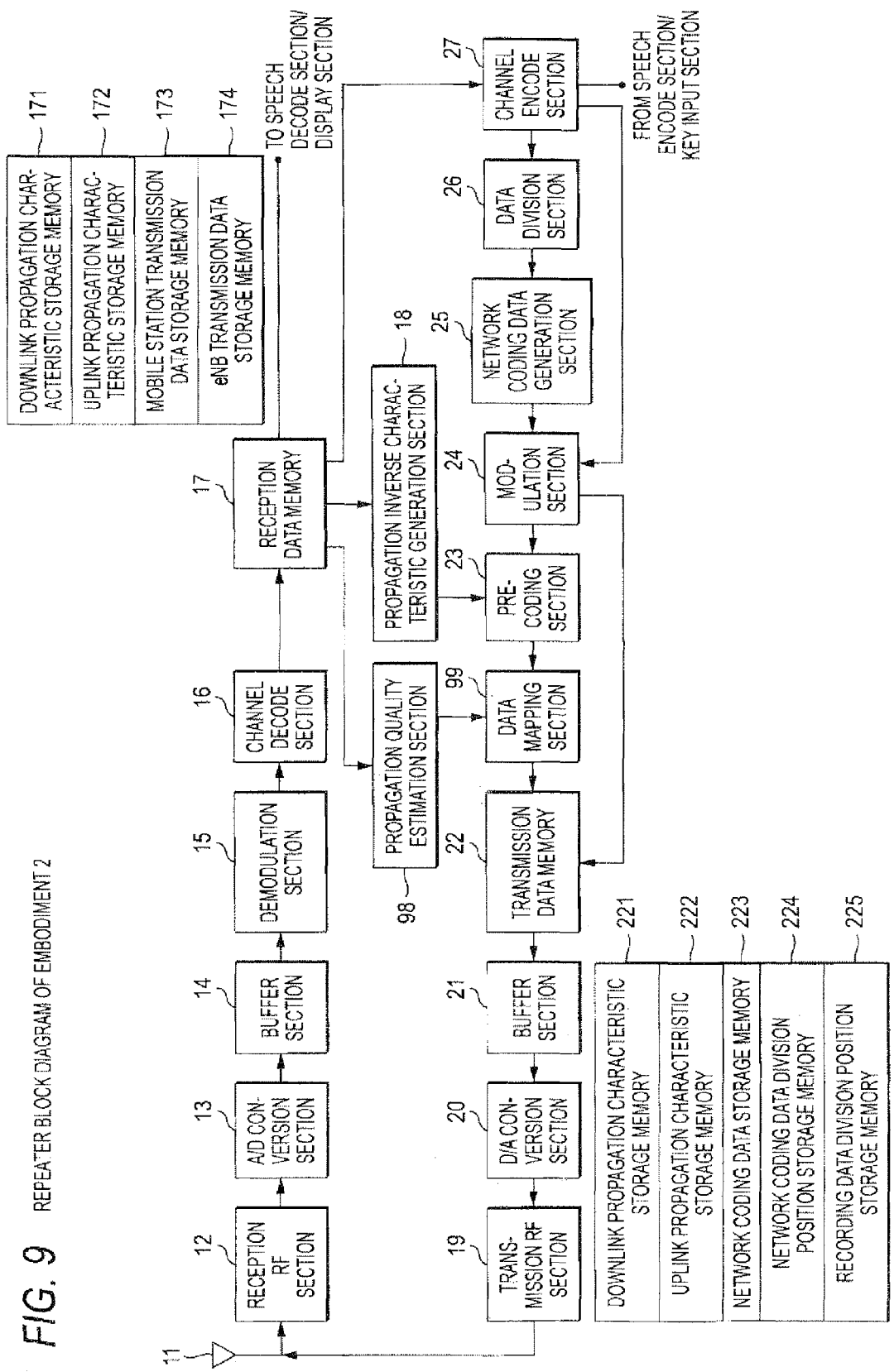
FIG. 9 is a block diagram of a repeater of Embodiment 2 in the wireless relay station apparatus of the invention.
Figure 10:
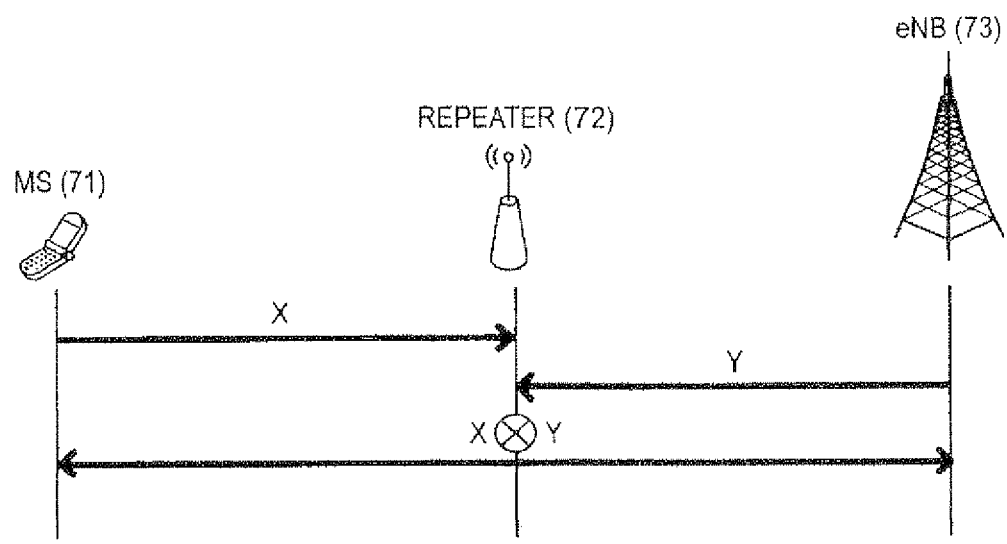
FIG. 10 is a drawing to show a conventional wireless repeating system made up of a mobile station (MS) 71, a repeater 72, and an eNB 73.
Figure 11:
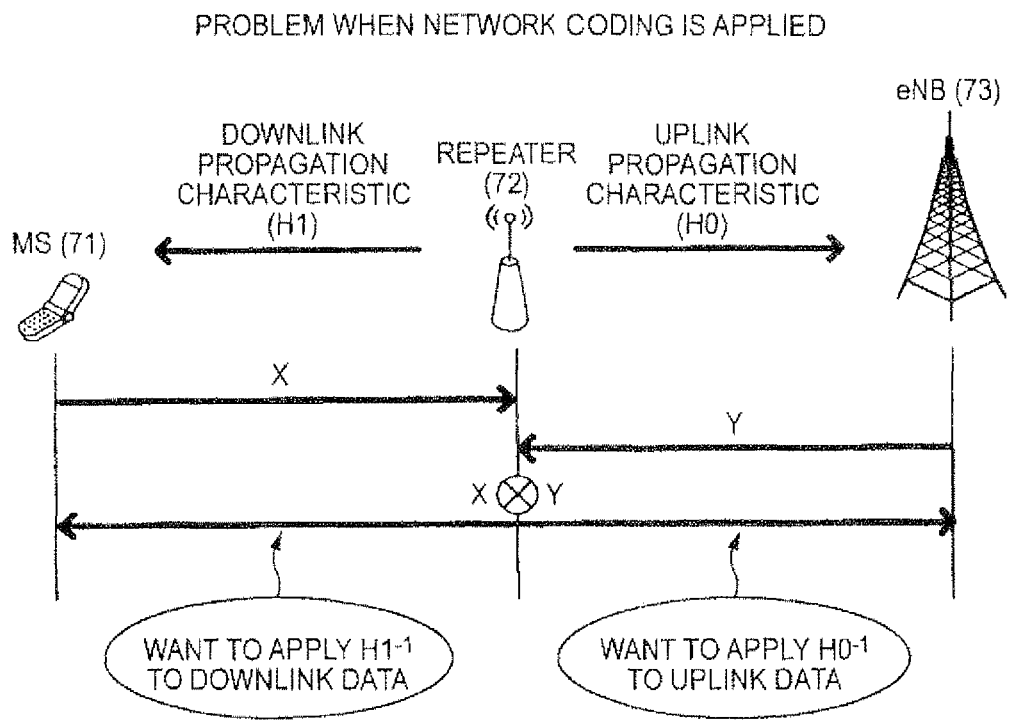
FIG. 11 is a drawing to describe a problem when network coding is applied to a wireless repeating system.
Figure 12:
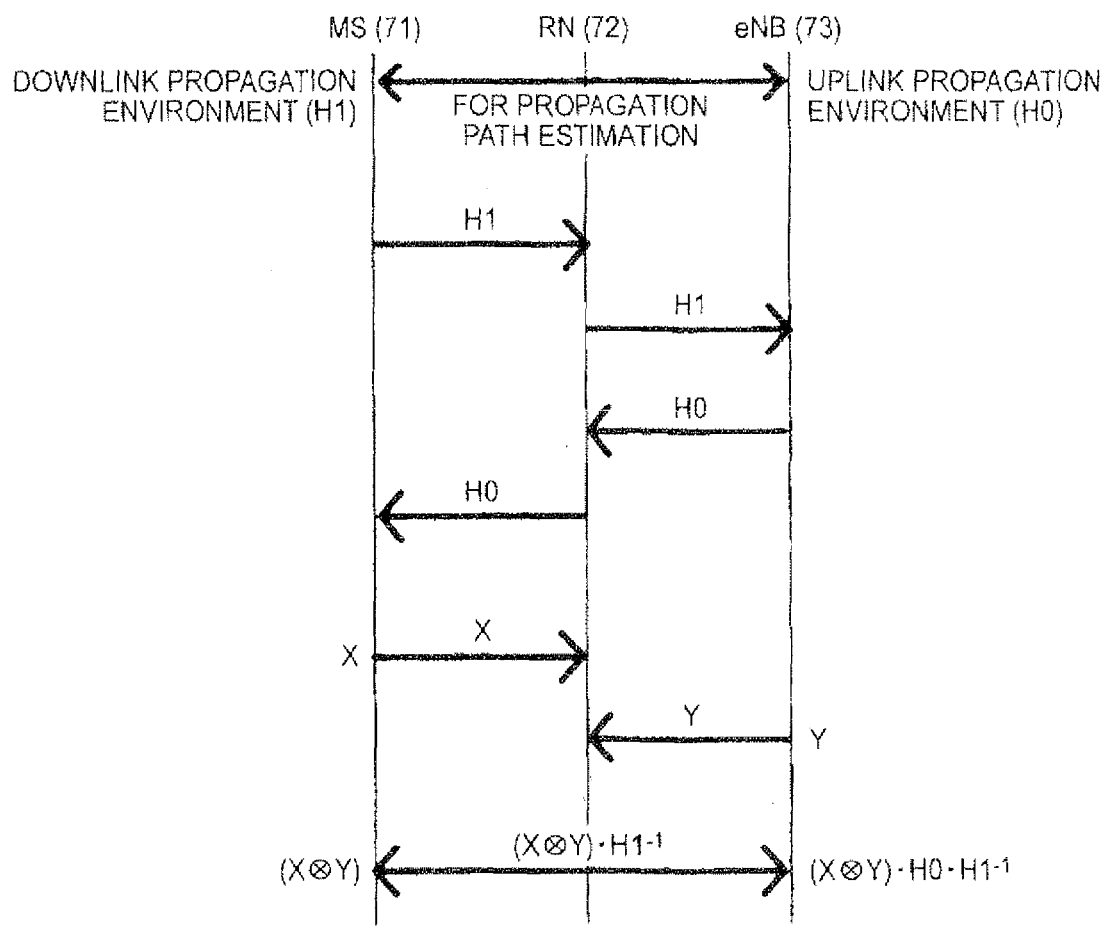
FIG. 12 is an operation sequence chart when network coding is applied to the wireless repeating system.
Figure 13:
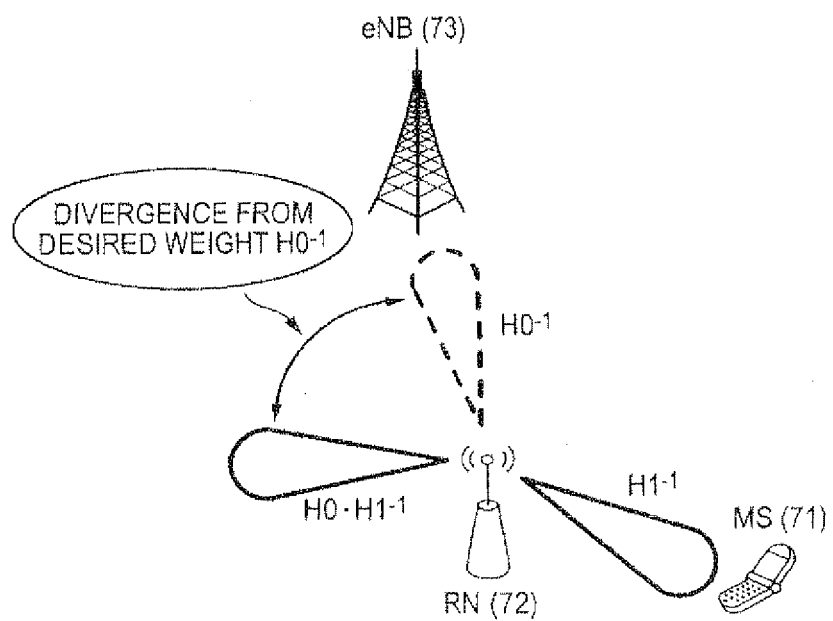
FIG. 13 is an image drawing to describe a problem when network coding is applied to the wireless repeating system.

Next, block diagrams of the repeater 72, the mobile station 71, and the eNB 73 according to Embodiment 2 will be discussed. The same components identical with those of Embodiment 1 are denoted by the same reference numerals and will be discussed. FIG. 9 is the block diagram of the repeater 72 of Embodiment 2.

<<Propagation Characteristic Reception Operation from Mobile Station 71 and eNB 73>>

The repeater 72 receives [downlink propagation characteristic H1 from mobile station 71] in a reception RF section 12. The received signal is down converted up to the baseband in the reception RF section 12 and the signal is input to an A/D conversion section 13. The signal input to the A/D conversion section 13 is converted into a digital signal and the digital signal is stored in a buffer 14 and the demodulation and channel decode processing result of the signal is stored in "downlink propagation characteristic storage memory 171" of reception data memory 17.

Likewise, the repeater 72 receives [uplink propagation characteristic H0 from eNB 73] in the reception RF section 12. The received signal is down converted up to the baseband in the reception. RF section 12 and the signal is input to the A/D conversion section 13. The signal input to the A/D conversion section 13 is converted into a digital signal and the digital signal is stored in the buffer 14 and the demodulation and channel decode processing result of the signal is stored in "uplink propagation characteristic storage memory 172" of the reception data memory 17.

<<Propagation Characteristic Transmission Operation to Mobile Station 71 and eNB 73>>

The repeater 72 reads the downlink propagation characteristic H1 from the "downlink propagation characteristic storage memory 171" of the reception data memory 17 and executes channel encode in a channel encode section 27. The data subjected to the channel encode is modulated in a modulation section 24 and is stored in "downlink propagation characteristic storage memory 221" of transmission data memory 22.

Subsequently, the downlink propagation characteristic H1 is read from the "downlink propagation characteristic storage memory 221" of the transmission data memory 22 and is stored in a buffer 21. Then, data of the downlink propagation characteristic H1 is converted into analog data in a D/A conversion section 20 and the analog data is up converted up to a signal in an RF band and is transmitted from a transmission antenna 11.

Likewise, the repeater 72 reads the uplink propagation characteristic H0 from the "uplink propagation characteristic storage memory 172" of the reception data memory 17 and executes channel encode in the channel encode section 27. The data of the uplink propagation characteristic H0 subjected to the channel encode is modulated in the modulation section 24 and is stored in "uplink propagation characteristic storage memory 222" of the transmission data memory 22.

Subsequently, the uplink propagation characteristic H0 is read from the "uplink propagation characteristic storage memory 222" of the transmission data memory 22 and is stored in the buffer 21 and then is converted into an analog signal in the D/A conversion section 20 and the analog signal is up converted up to a signal in the RF band in a transmission RF section 19 and is transmitted from the transmission antenna 11.

<<Data Reception Operation from Mobile Station 71 and eNB 73>>

The repeater 72 receives [transmission data X from mobile station 71] in the reception RF section 12. The received transmission data X is down converted up to the baseband in the reception RF section 12 and the data is input to the A/D conversion section 13. The transmission data X input to the A/D conversion section 13 is converted into a digital signal and the digital signal is stored in the buffer 14. The transmission data X is subjected to demodulation processing in a demodulation section 15 and code processing in a channel in a channel decode section 16 and then is stored in "mobile station transmission data storage memory 173" of the reception data memory 17.

Likewise, the repeater 72 receives [transmission data Y from eNB 73] in the reception RF section 12. The received transmission data Y is down converted up to the baseband in the reception RF section 12 and the data is input to the A/D conversion section 13. The transmission data Y input to the A/D conversion section 13 is converted into a digital signal and the digital signal is stored in the buffer 14. The transmission data Y is subjected to demodulation processing in the demodulation section 15 and code processing in the channel in the channel decode section 16 and then is stored in "eNB transmission data storage memory 174" of the reception data memory 17.

<<Network Coding Data Generation Operation>>

The repeater 72 reads the data X transmitted by the mobile station 71 from the "mobile station transmission data storage memory 173" of the reception data memory 17 and inputs the data to the channel encode section 27. The repeater 72 executes channel encode of the data X in the channel encode section 27 and divides the channel encode data X into "systematic part Sx" having systematic bits and "parity part Px" having parity bits in a data division section 26.

Likewise, the repeater 72 reads the data Y transmitted by the eNB 73 from the "eNB transmission data storage memory 174" of the reception data memory 17 and inputs the data to the channel encode section 27. The repeater 72 executes channel encode of the data Y in the channel encode section 27 and divides the channel encode data Y into "systematic part Sy" having systematic bits and "parity part Py" having parity bits in the data division section 26.

A network coding data generation section 25 XORs (exclusive ORs) the "systematic part Sx" and the "parity part Py" and likewise XORs (exclusive ORs) the "systematic part Sy" and the "parity part Px" to generate network coding data so that the "systematic part Sx" and the "systematic part Sy" of the important parts of the divided data do not overlap.

The division position of the network coding data is stored in "network coding data division position storage memory 224" of the transmission data memory 22.

<<Modulation Operation>>

The repeater 72 modulates the network coding data in the modulation section 24.

<<Propagation Inverse Characteristic Generation Operation>>

Subsequently, the repeater 72 reads the downlink propagation characteristic H1 from the "downlink propagation characteristic storage memory 171" of the reception data memory 17 and generates the inverse characteristic reception $H1^{-1}$ of H1 in a propagation inverse characteristic generation section 18. Likewise, the repeater 72 reads the uplink propagation characteristic H0 from the "uplink propagation characteristic storage memory 172" of the reception data memory 17 and generates the inverse characteristic reception $H0^{-1}$ of H0 in the propagation inverse characteristic generation section 18.

<<Precoding Operation>>

The repeater 72 applies the downlink propagation inverse characteristic $H1^{-1}$ generated in the propagation inverse characteristic generation section 18 to the network coding data (Sy XOR Px) containing the "systematic part Sy" important for the mobile station 71 in a precoding section 23 so as to compensate for the downlink propagation characteristic H1 applied at the reception time to the mobile station 71.

Likewise, the repeater 72 applies the uplink propagation inverse characteristic $H0^{-1}$ generated in the propagation inverse characteristic generation section 18 to the network coding data (Sx XOR Py) containing the "systematic part Sx" important for the eNB 73 in the precoding section 23 so as to compensate for the uplink propagation characteristic H0 applied at the reception time to the eNB 73.

<<Propagation Quality Estimation Operation>>

Next, to schedule considering the propagation quality of the parity part, the repeater 72 estimates the propagation quality of the parity part of the network coding data transmitted to the mobile station and the eNB based on the uplink propagation characteristic H0 and the downlink propagation characteristic H1.

First, the repeater 72 calculates the value of $H1 \cdot H0^{-1}$ and the value of $H0 \cdot H1^{-1}$ in a propagation quality estimation section 98 from the downlink propagation characteristic H1 and its inverse characteristic $H1^{-1}$ and the uplink propagation characteristic H0 and its inverse characteristic $H0^{-1}$.

$H1 \cdot H0^{-1}$ is the propagation characteristic of the parity part of the network coding data received in the mobile station 71 and can be used as index of the propagation quality of the parity part of the network coding data received in the mobile station 71. Likewise, H0(H1-1 is the propagation characteristic of the parity part of the network coding data received in the eNB 73 and can be used as index of the propagation quality of the parity part of the network coding data received in the eNB 73.

For example, SNR (Signal to Noise Ratio), Bit Error Rate (BER), the reception level, etc., can be applied as the propagation quality of the parity part of the network coding data received in the mobile station 71 and the eNB 73.

Figure 8:
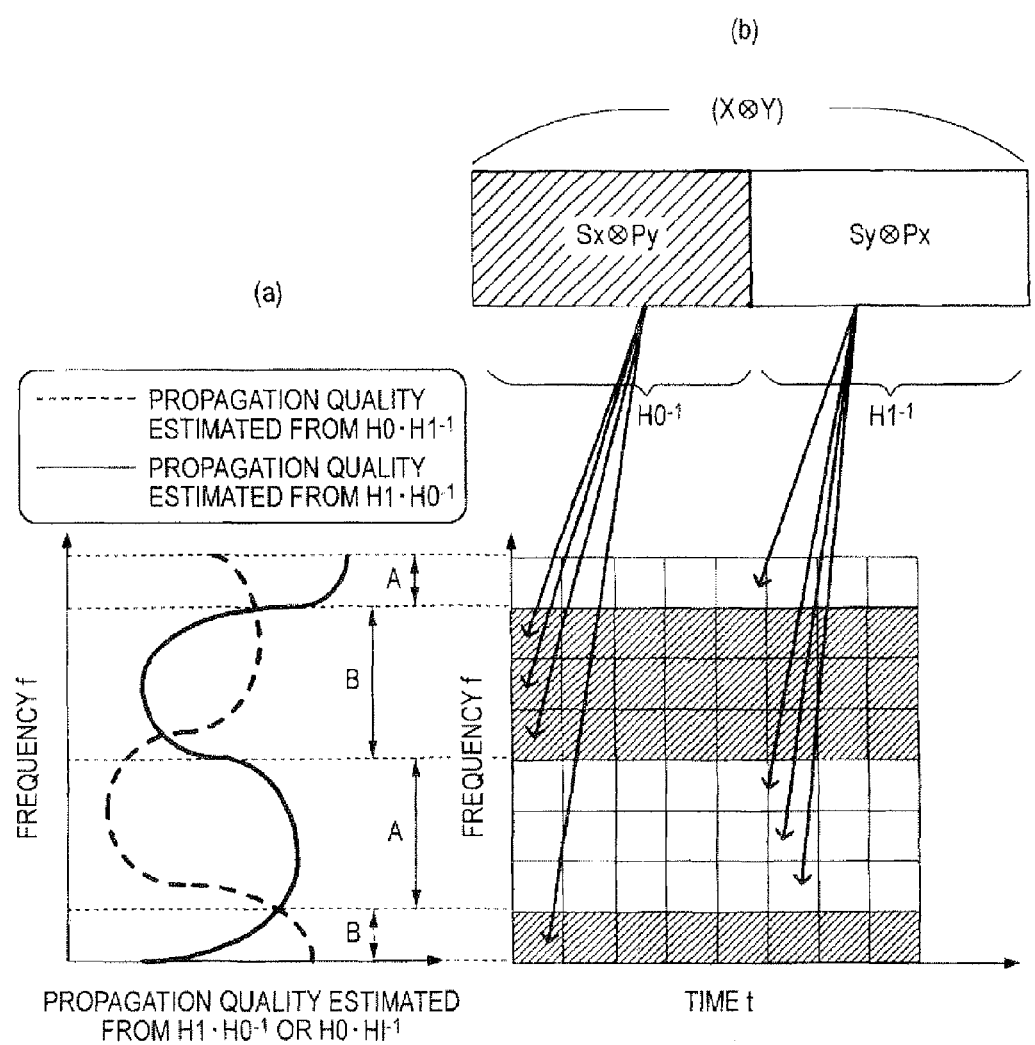
FIG. 8 (a) is a drawing to show an example of propagation quality estimated from the calculation result of the value of $H1 \cdot H0^{-1}$ and the value of $H0 \cdot H1^{-1}$ and (b) is a drawing to show an example of allocation of transmission resources based on the calculation result shown in FIG. 8 (a).

FIG. 8 (*a*) shows an example of the propagation quality estimated from the calculation result of the value of H1(H0-1 and the value of H0(H1-1. The vertical axis of FIG. 8 (*a*) indicates frequency f and the horizontal axis indicates the propagation quality estimated from H1(H0-1 or H0(H1-1. The repeater 72 estimates the propagation quality of the parity part of the network coding data transmitted to the mobile station and the eNB. In a frequency band A shown in FIG. 8 (*a*), the propagation quality estimated from H1 (H0-1 is better than the propagation quality estimated from H0(H1-1. Thus, in the frequency band A, it is estimated that the propagation quality of the parity part of the network coding data repeated by the repeater 72 to the mobile station 71 is better than the propagation quality of the parity part of the network coding data repeated by the repeater 72 to the eNB 73. On the other hand, in a frequency band B shown in FIG. 8 (*a*), the propagation quality estimated from H0(H1-1 is better than the propagation quality estimated from H1(H0-1. Thus, in the frequency band B, it is estimated that the propagation quality of the parity part of the network coding data repeated by the repeater 72 to the eNB 73 is better than the propagation quality of the parity part of the network coding data repeated by the repeater 72 to the mobile station 71.

Next, the repeater 72 allocates the transmission resources to the data transmitted to the mobile station and the eNB in a data mapping section from the estimation result of the propagation quality of the parity part as described above. FIG. 8 (*b*) is a drawing to show an example of allocation of the resources based on the calculation result shown in FIG. 8 (*a*). The vertical axis of FIG. 8 (*b*) indicates frequency f and the horizontal axis indicates time t. As shown in FIG. 8 (*b*), in the frequency band A, scheduling is performed so as to allocate the transmission resources to the network coding data to the mobile station 71. On the other hand, in the frequency band B, scheduling is performed so as to allocate the transmission resources to the network coding data to the eNB 73.

Next, in the precoding section 23, the finally generated network coding data from the network coding data (Sy XOR Px) containing the [systematic part Sy] important for the mobile station 71 and the network coding data (Sx XOR Py) having the [systematic part Sx] important for the eNB 73 is stored in [network coding data storage memory 223] of the transmission data memory 22. The division position of precoding is stored in [precoding division position storage memory 225] of the transmission data memory 22.

<<Network Coding Data Transmission Data>>

The network coding data of the repeater 72 is read from the "network coding data storage memory 223" of the transmission data memory 22 and is stored in the buffer 21 and then is converted into analog data in the D/A conversion section 20 and the analog data is up converted up to a signal in the RF band in a transmission RF section 19 and is transmitted from the transmission antenna 11.

Likewise, the division position of the network coding data is read from the [network coding data division position storage memory 224] of the transmission data memory 22, the division position of the precoding is read from the [precoding division position storage memory 225] of the transmission data memory 22 and the data is stored in the buffer 21 and then is converted into analog data in the D/A conversion section 20 and the analog data is up converted up to a signal in the RF band in the transmission RF section 19 and is transmitted from the transmission antenna 11.

The mobile station and the eNB of Embodiment 2 differ from the mobile station and the eNB of Embodiment 1 only in that the network coding received from the repeater is scheduled also considering the propagation quality of the parity part of the network coding data. Thus, the mobile station and the eNB of Embodiment 2 can ideally receive the systematic part having the important systematic bits and further the reception performance of the parity part also improves.

As described above, according to Embodiment 2, the mobile station 71 and the eNB 73 can ideally receive the systematic part having the important systematic bits, so that while data can be reliably received, the reception performance of the whole system improves. Further, the repeater schedules considering the propagation quality of the parity part, so that the reception performance of the parity part also improves in the mobile station 71 and the eNB 73.

In embodiment 2, if the parity part of the network coding data is made up of a plurality of parity parts, for example, if superiority or inferiority exists between the parity parts from the viewpoint of error detection, the parity parts may be adopted as slicing of resource allocation. Likewise, in Embodiment 2, superiority or inferiority exists depending on the position in the parity part of the network coding data, the position in the parity part may be adopted as slicing of allocation.

In Embodiment 2, the division position is described as for the case where the division position is contained in the header of the network coding data, but the embodiment is not limited to it. The division position information may be received as control data at the timing at which the division position is changed.

Each of the function block diagrams used in the description of the embodiments is implemented typically as an LSI of an integrated circuit. The function blocks may be put individually into one chip or may be put into one chip so as to contain some or all. Here, the integrated circuit is an LSI, but may be called an IC, a system LSI, a super LSI, or an ultra LSI depending on the difference in integration degree.

The technique of putting into an integrated circuit is not limited to an LSI and it may be implemented as a dedicated circuit or a general-purpose processor. An FPGA (Field Programmable Gate Array) that can be programmed after LSI is manufactured or a re-configurable processor wherein connection and setting of circuit cells in LSI can be reconfigured may be used.

Further, if a technology of putting into an integrated circuit replacing LSI appears with the progress of the semiconductor technology or another deriving technology, the function blocks may be integrated using the technology, of course. There can be a possibility of applying a biotechnology, etc.

In the embodiments, the antenna is described, but an antenna port can also be applied. The antenna port refers to a logical antenna made up of one or a plurality of physical antennas. That is, the antenna port does not necessarily refer to one physical antenna and may refer to an array antenna made up of a plurality of antennas or the like. For example, in LTE, how many physical antennas make up an antenna port is not stipulated, and the antenna port is stipulated as the minimum unit in which a base station can transmit a different reference signal. The antenna port may be stipulated as the minimum unit for multiplying weight of a precoding vector.

This application is based on Japanese Patent Application (No. 2008-130749) filed on May 19, 2008 and Japanese Patent Application (No. 2008-220138) filed on Aug. 28, 2008, which are incorporated herein by reference.

INDUSTRIAL APPLICABILITY

The invention can be used as the wireless relay station apparatus for enabling the mobile station and the base station to reliably receive the network coding data and to provide sufficient reception performance.

DESCRIPTION OF REFERENCE NUMERALS 11, 31, 51 Antenna
12, 32, 52 Reception RF section
13, 33, 53 A/D conversion section
14, 21, 34, 42, 54, 62 Buffer section
15, 36, 56 Demodulation section
16, 37, 57 Channel decode section
17, 38, 58 Reception data memory
18, 39, 59 Propagation inverse characteristic generation section
19, 40, 60 Transmission RF section
20, 41, 61 D/A conversion section
22, 43, 63 Transmission data memory
23 Precoding section
24, 44, 64 Conversion section
25 Network coding data generation section
26 Data division section
27, 45, 65 Channel encode section
35, 55 Propagation characteristic estimation section
71 Mobile station
72 Repeater
73 eNB
98 Propagation quality estimation section
99 Data mapping section
171, 221, 381, 431, 582 Downlink propagation characteristic storage memory
172, 222, 382, 581, 631 Uplink propagation characteristic storage memory
173, 432, 587 Mobile station transmission data storage memory
173, 387, 632 eNB transmission data storage memory
223, 386, 586 Network coding data storage memory
224, 384, 584 Network coding data division position storage memory
225, 385, 585 Precoding division position storage memory
383 Uplink propagation inverse characteristic storage memory
583 Downlink propagation inverse characteristic storage memory

The invention claimed is:

1. A wireless relay station apparatus for relays between a first wireless communication apparatus and a second wireless communication apparatus, the wireless relay station apparatus comprising:
a reception section that receives data from the first wireless communication apparatus and the second wireless communication apparatus;
a network coding data generation section that generates network coding data using first data received from the first wireless communication apparatus and second data received from the second wireless communication apparatus, wherein the network coding data is generated by dividing each of the first data and the second data into a highly important block and a low important block and processing an exclusive OR operation between the highly important block of the first data and the low important block of the second data and between the highly important block of the second data and the low important block of the first data;
a precoding section that applies a first precoding to one part of the network coding data and a second precoding to another part of the network coding data to generate precoded network coding data, the first precoding and the second precoding being different from each other; and
a transmission section that transmits the precoded network coding data.

2. The wireless relay station apparatus according to claim 1, wherein the highly important block of each of the data contains a systematic part having a systematic bit and the low important block of each of the data contains a parity part having a parity bit.

3. The wireless relay station apparatus according to claim 2, comprising:
an estimation section that estimates propagation quality communicating with the first wireless communication apparatus relating to the low important block and propagation quality communicating with the second wireless communication apparatus relating to the low important block, based on a propagation characteristic communicating with the first wireless communication apparatus and an inverse characteristic of the propagation characteristic communicating with the first wireless communication apparatus, and based on a propagation characteristic communicating with the second wireless communication apparatus and an inverse characteristic of the propagation characteristic communicating with the second wireless communication apparatus; and
a resource allocation section that allocates transmission resources to the network coding data for transmitting the network coding data.

4. The wireless relay station apparatus according to claim 2, wherein the first part of the network coding data contains the systematic part of the first data and the another part of the network coding data contains the systematic part of the second data; and wherein
the precoding section applies the inverse characteristic of the propagation characteristic communicating with the second communication apparatus to the first part of the network coding data, and applies the inverse characteristic of the propagation characteristic communicating with the first communication apparatus to the another part of the network coding data.

5. The wireless relay station apparatus according to claim 4, wherein a ratio between the first part of the network coding data and the other part of the network coding data is set so that Signal-to-Interference plus Noise Power Ratio in each wireless communication apparatus becomes the maximum, the network coding data is transmitted to each wireless communication apparatus.

6. The wireless relay station apparatus according to claim 2, wherein a precoding position of the network coding data is set so that Signal-to-Interference plus Noise Power Ratio in at least one of the first wireless communication apparatus and the second wireless communication apparatus becomes the maximum, the network coding data is transmitted to at least one of the first wireless communication apparatus and the second wireless communication apparatus.

7. A wireless communication apparatus that transmits and receives data through a wireless relay station apparatus for communication with a communication partner apparatus, the wireless communication apparatus comprising:

a reception section that receives network coding data transmitted from the wireless relay station apparatus, wherein the network coding data is generated by processing exclusive OR operation between a systematic part having a systematic bit of each of first and second data and a parity part having a parity bit of each of the first and second data and applying different precoding to one part and the other part of the network coding data, by using the first data received through the wireless relay station apparatus from the communication partner apparatus and the second data transmitted from the wireless communication apparatus through the wireless relay station apparatus to the communication partner apparatus; and a demodulation section that demodulates the first data required for the wireless communication apparatus from the networking coding data received from the communication partner apparatus through the wireless relay station apparatus, based on a division position of the network coding data for separating the systematic part and the parity part and a precoding division position for performing the different precoding.

8. The wireless communication apparatus according to claim 7, wherein when the one part of the network coding data contains the systematic part of the first data, the other part of the network coding data contains the systematic part of the second data, and as the precoding, an verse characteristic of a first propagation characteristic between the wireless relay station apparatus and the wireless communication apparatus is applied to the one part of the network coding data and an inverse characteristic of a second propagation characteristic between the wireless relay station apparatus and the communication partner apparatus is applied to the other part of the network coding data, the demodulation section demodulates the one part of the received network coding data using the second data from the wireless communication apparatus and demodulates the other part of the received network coding data using the second data from the wireless communication apparatus after the first propagation characteristic and the inverse characteristic of the second propagation characteristic are applied to the network coding data, based on the division position of the network coding data, the precoding division position, the first propagation characteristic, and the second propagation characteristic.

9. A wireless communication method for relays between a first wireless communication apparatus and a second wireless communication apparatus, the wireless communication method comprising:

receiving data from the first wireless communication apparatus and the second wireless communication apparatus;

generating network coding data using first data received from the first wireless communication apparatus and second data received from the second wireless communication apparatus, wherein the network coding data is generated by dividing each of the first data and the second data into a highly important block and a low important block and processing an exclusive OR operation between the highly important block of the first data and the low important block of the second data and between the highly important block of the second data and the low important block of the first data;

applying a first precoding to one part of the network coding data and a second precoding to another part of the network coding data to generate precoded network coding data, the first precoding and the second precoding being different from each other; and transmitting the precoded network coding data.

10. A wireless communication method for transmitting and receiving data through a wireless relay station apparatus for communication with a communication partner apparatus, the wireless communication method comprising:

receiving network coding data transmitted from the wireless relay station apparatus, wherein the network coding data is generated by processing exclusive OR operation between a systematic part having a systematic bit of each of first and second data and a parity part having a parity bit of each of the first and second data and applying different precoding to one part and the other part of the network coding data by using the first data received through the wireless relay station apparatus from the communication partner apparatus and the second data transmitted from the wireless communication apparatus through the wireless relay station apparatus to the communication partner apparatus; and demodulating the first data required for the wireless communication apparatus from the networking coding data received from the communication partner apparatus through the wireless relay station apparatus, based on a division position of the network coding data for separating the systematic part and the parity part and a precoding division position for performing the different precoding.

* * * * *